United States Patent [19]
Newman

[11] Patent Number: 5,247,632
[45] Date of Patent: Sep. 21, 1993

[54] VIRTUAL MEMORY MANAGEMENT ARRANGEMENT FOR ADDRESSING MULTI-DIMENSIONAL ARRAYS IN A DIGITAL DATA PROCESSING SYSTEM

[75] Inventor: Gary H. Newman, Concord, Mass.

[73] Assignee: Eastman Kodak Company, Rochester, N.Y.

[21] Appl. No.: 737,922

[22] Filed: Jul. 29, 1991

Related U.S. Application Data

[63] Continuation of Ser. No. 300,783, Jan. 23, 1989, abandoned.

[51] Int. Cl.⁵ .................. G06F 12/10; G11C 8/00
[52] U.S. Cl. .................. 395/400; 395/425; 365/230.01; 364/256.3; 364/255.1; 364/DIG. 1
[58] Field of Search .................. 395/400, 425, 775; 365/230.01, 231; 340/724; 364/200 MS File, 900 MS File

[56] References Cited

U.S. PATENT DOCUMENTS

| | | | |
|---|---|---|---|
| 4,296,468 | 10/1981 | Bandoh et al. | 364/200 |
| 4,356,549 | 10/1982 | Chueh | 364/200 |
| 4,466,056 | 8/1984 | Tanahashi | 364/200 |
| 4,618,858 | 10/1986 | Belch | 340/724 |
| 4,638,426 | 1/1987 | Chang et al. | 364/200 |
| 4,680,700 | 7/1987 | Hester et al. | 364/200 |
| 4,763,244 | 8/1988 | Moyer et al. | 364/200 |
| 4,800,489 | 1/1989 | Moyer et al. | 364/200 |

OTHER PUBLICATIONS

Trevett, "Interactive Processing of Large Images", Jan. 1989.
Henry M. Levy and Peter H. Lipman, Virtual Memory Management in the VAX/VMS Operating System, IEEE Computer, Mar., 1982.
Shreekant S. Thakkar, Alan E. Knowles, A High-Performance Memory Management Scheme, 1986 IEEE Computer, May, 1986.
Ben Tsutom Wada, A Virtual Memory System For Picture Processing, Communications of the ACM, vol. 27, No. 5, May, 1984.

*Primary Examiner*—Michael R. Fleming
*Assistant Examiner*—Gopal C. Ray
*Attorney, Agent, or Firm*—Gary A. Walpert; Mark Z. Dudley

[57] ABSTRACT

A virtual memory management arrangement translates a process virtual address of an item of data in an array of data into a physical address for use in accessing a memory. A virtual address translation portion forms, in response to a process virtual address, an array virtual address including a sub-array identifier identifying a sub-array in the array and an array virtual offset identifying a virtual storage location in the sub-array. A physical address translation portion forms, in response to the array virtual address, a physical address for use in accessing a memory.

25 Claims, 9 Drawing Sheets

| D<3:0> | | | |
|---|---|---|---|
| 8 | Y<7:0><br>(PVA<31:24>) | Y<7:0><br>(PVA<23:16>) | X<7:0><br>(PVA<31:00>) | X<7:0><br>(PVA<07:00>) |
| 7 | S<9> | Y<7:0><br>(PVA<30:23>) | Y<7:0><br>(PVA<22:15>) | X<7:0><br>(PVA<15:08>) | X<7:0> |
| 6 | S<9:8> | Y<7:0><br>(PVA<29:22>) | Y<7:0><br>(PVA<21:14>) | X<6:0> | X<7:0> |
| 5 | S<9:7> | Y<7:0><br>(PVA<28:21>) | Y<7:0><br>(PVA<20:13>) | X<5:0> | X<7:0> |
| 4 | S<9:6> | Y<7:0><br>(PVA<27:20>) | Y<7:0><br>(PVA<19:12>) | X<4:0> | X<7:0> |
| 3 | S<9:5> | Y<7:0><br>(PVA<26:19>) | Y<7:0><br>(PVA<18:11>) | X<3:0> | X<7:0> |
| 2 | S<9:4> | Y<7:0><br>(PVA<25:18>) | Y<7:0><br>(PVA<17:10>) | X<2:0> | X<7:0> |
| 1 | S<9:3> | Y<7:0><br>(PVA<24:17>) | Y<7:0><br>(PVA<16:09>) | X<1:0> | X<7:0> |
| 0 | S<9:2><br>(PVA<31:24>) | Y<7:0><br>(PVA<23:16>) | Y<7:0><br>(PVA<15:08>) | X<0> | X<7:0> |

PROCESS VIRTUAL ADDRESS
PVA<31:00>

PROCESS VIRTUAL ADDRESS CONFIGURATION

FIG. 4B

| D<3:0> | ARRAY VIRTUAL ADDRESS AVA <31:00> | | | |
|---|---|---|---|---|
| 8 | Y<7:0> (AVA<31:24>) | X<7:0> (AVA<23:16>) | Y<7:0> (AVA<15:08>) | X<7:0> (AVA<15:08>) |
| 7 | S<9> | Y<7:0> (AVA<30:23>) | X<6:0> | X<7:0> |
| 6 | S<9:8> | Y<7:0> (AVA<29:22>) | X<5:0> | X<7:0> |
| 5 | S<9:7> | Y<7:0> (AVA<28:21>) | X<4:0> | X<7:0> |
| 4 | S<9:6> | Y<7:0> (AVA<27:20>) | X<3:0> | X<7:0> |
| 3 | S<9:5> | Y<7:0> (AVA<26:19>) | X<2:0> | X<7:0> |
| 2 | S<9:4> | Y<7:0> (AVA<25:18>) | X<1:0> | X<7:0> |
| 1 | S<9:3> | Y<7:0> (AVA<24:17>) | X<0> | X<7:0> |
| 0 | S<9:2> | Y<7:0> (AVA<23:16>) | Y<7:0> (AVA<15:08>) | X<7:0> (AVA<15:08>) |

ARRAY VIRTUAL ADDRESS CONFIGURATION

FIG. 4C

PROGRAM FOR PLA 56A

D <3:0> = 0

AVA <23> = PVA <23>
AVA <22> = PVA <22>
AVA <21> = PVA <21>
AVA <20> = PVA <20>

D <3:0> = 1

AVA <23> = PVA <23>
AVA <22> = PVA <22>
AVA <21> = PVA <21>
AVA <20> = PVA <20>

D <3:0> = 2

AVA <23> = PVA <23>
AVA <22> = PVA <22>
AVA <21> = PVA <21>
AVA <20> = PVA <20>

D <3:0> = 3

AVA <23> = PVA <23>
AVA <22> = PVA <22>
AVA <21> = PVA <21>
AVA <20> = PVA <20>

D <3:0> = 4

AVA <23> = PVA <23>
AVA <22> = PVA <22>
AVA <21> = PVA <21>
AVA <20> = PVA <20>

D <3:0> = 5

AVA <23> = PVA <23>
AVA <22> = PVA <22>
AVA <21> = PVA <21>
AVA <20> = PVA <12>

D <3:0> = 6

AVA <23> = PVA <23>
AVA <22> = PVA <22>
AVA <21> = PVA <13>
AVA <20> = PVA <12>

D <3:0> = 7

AVA <23> = PVA <23>
AVA <22> = PVA <14>
AVA <21> = PVA <13>
AVA <20> = PVA <12>

D <3:0> = 8

AVA <23> = PVA <15>
AVA <22> = PVA <14>
AVA <21> = PVA <13>
AVA <20> = PVA <12>

FIG. 4D

PROGRAM FOR PLA 56B

D <3:0> = 0

AVA <19> = PVA <19>
AVA <18> = PVA <18>
AVA <17> = PVA <17>
AVA <16> = PVA <16>

D <3:0> = 1

AVA <19> = PVA <19>
AVA <18> = PVA <18>
AVA <17> = PVA <17>
AVA <16> = PVA <08>

D <3:0> = 5

AVA <19> = PVA <11>
AVA <18> = PVA <10>
AVA <17> = PVA <09>
AVA <16> = PVA <08>

D <3:0> = 2

AVA <19> = PVA <19>
AVA <18> = PVA <18>
AVA <17> = PVA <09>
AVA <16> = PVA <08>

D <3:0> = 6

AVA <19> = PVA <11>
AVA <18> = PVA <10>
AVA <17> = PVA <09>
AVA <16> = PVA <08>

D <3:0> = 3

AVA <19> = PVA <19>
AVA <18> = PVA <10>
AVA <17> = PVA <09>
AVA <16> = PVA <08>

D <3:0> = 7

AVA <19> = PVA <11>
AVA <18> = PVA <10>
AVA <17> = PVA <09>
AVA <16> = PVA <08>

D <3:0> = 4

AVA <19> = PVA <11>
AVA <18> = PVA <10>
AVA <17> = PVA <09>
AVA <16> = PVA <08>

D <3:0> = 8

AVA <19> = PVA <11>
AVA <18> = PVA <10>
AVA <17> = PVA <09>
AVA <16> = PVA <08>

FIG. 4E

PROGRAM FOR PLA 56C

D <3:0> = 0

AVA <15> = PVA <15>
AVA <14> = PVA <14>
AVA <13> = PVA <13>
AVA <12> = PVA <12>

D <3:0> = 1

AVA <15> = PVA <16>
AVA <14> = PVA <15>
AVA <13> = PVA <14>
AVA <12> = PVA <13>

D <3:0> = 2

AVA <15> = PVA <17>
AVA <14> = PVA <16>
AVA <13> = PVA <15>
AVA <12> = PVA <14>

D <3:0> = 3

AVA <15> = PVA <18>
AVA <14> = PVA <17>
AVA <13> = PVA <16>
AVA <12> = PVA <15>

D <3:0> = 4

AVA <15> = PVA <19>
AVA <14> = PVA <18>
AVA <13> = PVA <17>
AVA <12> = PVA <16>

D <3:0> = 5

AVA <15> = PVA <20>
AVA <14> = PVA <19>
AVA <13> = PVA <18>
AVA <12> = PVA <17>

D <3:0> = 6

AVA <15> = PVA <21>
AVA <14> = PVA <20>
AVA <13> = PVA <19>
AVA <12> = PVA <18>

D <3:0> = 7

AVA <15> = PVA <22>
AVA <14> = PVA <21>
AVA <13> = PVA <20>
AVA <12> = PVA <19>

D <3:0> = 8

AVA <15> = PVA <23>
AVA <14> = PVA <22>
AVA <13> = PVA <21>
AVA <12> = PVA <20>

FIG. 4F

PROGRAM FOR PLA 56D

D <3:0> = 0

AVA <11> = PVA <11>
AVA <10> = PVA <10>
AVA <09> = PVA <09>
AVA <08> = PVA <08>

D <3:0> = 1

AVA <11> = PVA <12>
AVA <10> = PVA <11>
AVA <09> = PVA <10>
AVA <08> = PVA <09>

D <3:0> = 2

AVA <11> = PVA <13>
AVA <10> = PVA <12>
AVA <09> = PVA <11>
AVA <08> = PVA <10>

D <3:0> = 3

AVA <11> = PVA <14>
AVA <10> = PVA <13>
AVA <09> = PVA <12>
AVA <08> = PVA <11>

D <3:0> = 4

AVA <11> = PVA <15>
AVA <10> = PVA <14>
AVA <09> = PVA <13>
AVA <08> = PVA <12>

D <3:0> = 5

AVA <11> = PVA <16>
AVA <10> = PVA <15>
AVA <09> = PVA <14>
AVA <08> = PVA <13>

D <3:0> = 6

AVA <11> = PVA <17>
AVA <10> = PVA <16>
AVA <09> = PVA <15>
AVA <08> = PVA <14>

D <3:0> = 7

AVA <11> = PVA <18>
AVA <10> = PVA <17>
AVA <09> = PVA <16>
AVA <08> = PVA <15>

D <3:0> = 8

AVA <11> = PVA <19>
AVA <10> = PVA <18>
AVA <09> = PVA <17>
AVA <08> = PVA <16>

FIG. 4G

VIRTUAL MEMORY MANAGEMENT ARRANGEMENT FOR ADDRESSING MULTI-DIMENSIONAL ARRAYS IN A DIGITAL DATA PROCESSING SYSTEM

This is a continuation of copending application Ser. No. 07/300,783 filed on Jan. 23, 1989 now abandoned.

FIELD OF THE INVENTION

The invention relates generally to the field of computer systems, and more particularly to computer systems providing virtual memory management support.

BACKGROUND OF THE INVENTION

A typical computer system includes three basic elements, namely, a processor, a memory and an input/output system. The memory stores information, including data and instructions for processing the data, in a plurality of addressable storage locations. The processor enables information to be transferred, or fetched, to it, interprets the incoming information as either instructions or data, and processes the data in accordance with the instructions. The processor then transfers the processed data to addressed locations in the memory for storage.

The input/output system also communicates with the memory and the processor in order to transfer information into the computer system and to obtain the processed data from it. For example, the input/output system may obtain processed data and print it on paper or display it on a monitor for viewing by an operator Units comprising the input/output system normally operate in accordance with control information supplied to it by the processor. The control information defines the operations to be performed by the input/output units. Typical units comprising the input/output system include, for example, printers, video display terminals, and secondary information storage devices such as disk and tape storage units.

In a number of computer systems, virtual memory arrangements have been provided which permit the programmer to write a program without having to be concerned either about the amount of physical memory, that is, the number of addressable storage locations, actually included in the system, or about other programs that the system may be processing concurrently. Virtual memory arrangements permit the programmer to generate a program and data, which may be many times larger than the amount of physical memory which may be included in a practical system.

In a typical computer system that provides a virtual memory arrangement, the computer executes each program in the context of a process, with each process having an associated virtual address space. The virtual address space, in turn, has a plurality of virtual addressable locations each identified by a virtual address. Each process's virtual address space is divided into equal-sized pages, and the physical address space of the computer's memory is divided into equally-sized blocks, with the number of storage locations in a block corresponding to the number of addressable locations in a page of virtual address space. Normally, pages containing most of the information, including the program's instructions and data, in a process' virtual address space are maintained on a secondary storage device and transferred, under control of an operating system program, to blocks in the physical memory as they are needed.

Typically, when information is transferred between memory and secondary storage, the amount of information transferred corresponds to that which will fill an integral number of blocks, when information is transferred to the memory, or which is in an integral number of blocks, when information is transferred from the memory for storage in secondary storage.

When a page is transferred from a secondary storage unit to the computer's physical memory, it may be stored in any block in the physical memory. During processing of a program, when a processor needs to transfer an item of information during either a fetch operation or a storage operation, the program provides an address in the virtual address space, which the operating system program and/or hardware normally contained in the processor translates to provide the address in memory of the item of information. Typically, a virtual address is divided into two parts, namely, a virtual page identifier, which identifies a page in the virtual address space, and an offset which identifies the displacement, into the page, to the virtual storage location containing the required information or into which data is to be stored. During translation, the virtual page identifier is used to identify the block in the physical memory, and the offset in the virtual address is used to identify the offset into the block in the physical memory to identify the storage location from which information is to be fetched or into which information is to be stored.

SUMMARY OF THE INVENTION

The invention provides a new and improved virtual memory management arrangement and method for a computer system for use in connection with variable sized multi-dimensional arrays of data.

In brief summary, the virtual memory management arrangement translates a virtual address into a physical address for use in accessing a memory. A virtual address translation portion forms, in response to a virtual address from a process, an array virtual address including a sub-array identifier identifying a sub-array in the array and a sub-array virtual offset identifying a virtual storage location in the sub-array. A physical address translation portion forms, in response to the array virtual address, a physical address for use in accessing a memory.

The method in accordance with the invention includes the step of forming, in response to a process virtual address, an array virtual address including a sub-array identifier identifying a sub-array in said array and a sub-array virtual offset identifying a virtual storage location in the sub-array. During a subsequent physical address translation step a physical address is formed, in response to the array virtual address, for use in accessing a memory.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 4A through 4G depict a circuit illustrating one embodiment of the invention.

DETAILED DESCRIPTION OF AN ILLUSTRATIVE EMBODIMENT

With reference to the drawings, a virtual memory management arrangement in accordance with the invention provides a two-step translation process to translate a process virtual address 10 of an item of data in a multi-dimensional array of data into a physical address 11 for use in addressing a physical memory in a computer system (not shown). In the arrangement, in the first translation step, the process virtual address 10 is translated into an array virtual address 12, and, in the second translation step, the array virtual address is translated into the physical address 11.

Figure 1:
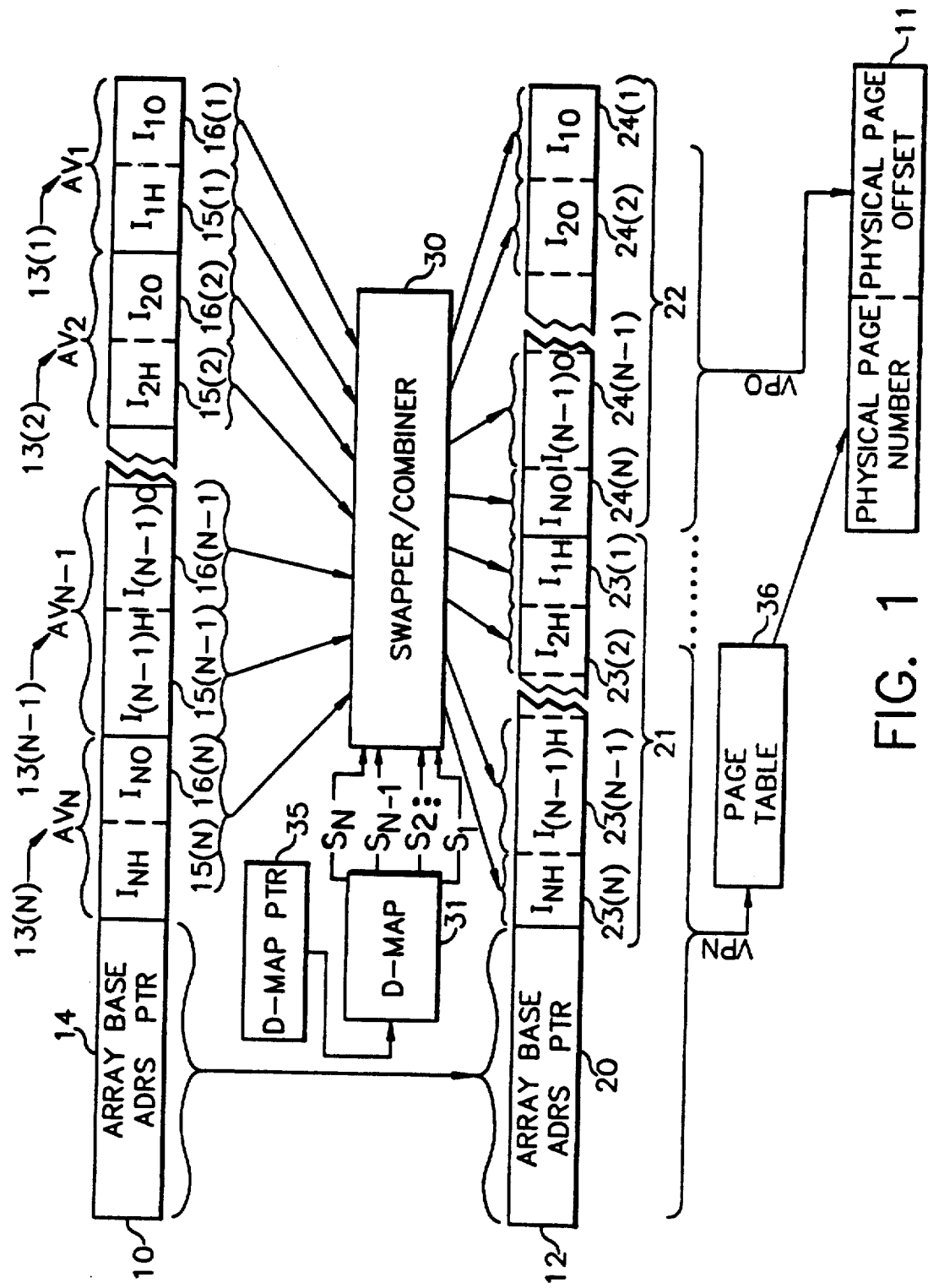
FIG. 1 depicts a virtual memory management arrangement in accordance with the invention.

In accordance with the invention, the array, which has N dimensions (where "N" is an integer), is divided into a plurality of equally-sized sub-arrays each also having N dimensions. As shown in FIG. 1, each item of data in the array is identified by a process virtual address 10 which includes a number of fields. In particular, the array virtual address 10 includes a plurality of displacement fields 13(1) through 13(N) each of which contains the displacement, $AV_k$ ("k" being an integer between 1 and N), of the item of data in the array along each dimension. Each displacement field 13(k) further includes two fields, namely, a sub-array identification field 15(k), comprising the high-order portion $I_{kH}$ of the displacement field 13(k), and a sub-array offset field 16(k), comprising the low-order portion $I_{kO}$ of the displacement field 13(k). The sub-array identification field 15(k) identifies the displacement, in terms of the number of sub-arrays, along the particular dimension "k" to the sub-array which contains the item of data, and each sub-array offset field 16(k) identifies the displacement, in terms of the number of virtual addressable locations, also along the particular dimension "k" within the sub-array, to the item of data identified by the process virtual address 10.

In addition, the process virtual address 10 further includes an array base pointer field 14 the contents of which assist in locating the base, in the virtual address space, of the array containing the item of data addressed by the process virtual address. More particularly, if the contents of all of the displacement fields of the process virtual address 10 are zero, the process virtual address 10 points to the location in the virtual address space of the base of the array. The entire process virtual address 10, accordingly, includes a base pointer in field 14, which points to the base address of the array, that is, the location of the first data item in the array, and displacements along each dimension, with each displacement including a high-order portion that identifies the sub-array containing the item and a low-order portion that identifies the displacement in the sub-array to the particular data item being identified by the virtual address.

During the first virtual address translation step in the virtual memory management arrangement, the process virtual address 10 is translated into an array virtual address 12. The array virtual address 12 includes three major fields, including an array base address pointer field 20, a sub-array pointer field 21 and a sub-array offset field 22. The array base address pointer field contains the array base address pointer copied from field 14 of the process virtual address 10. The sub-array pointer field 21 contains a pointer value which identifies the sub-array in the array which contains the item of data identified by the process virtual address 10. Finally, the sub-array offset field 22 contains an offset value which identifies the item of data in the sub-array.

More particularly, the sub-array pointer field 21 in the array virtual address 12 includes a plurality of sub-array identification fields 23(k) ("k" being an integer from 1 to N) each of which contains a value corresponding to the high-order portion $I_{kH}$ taken from the corresponding sub-array identification field 15(k) in the process virtual address 10. The collection of sub-array identification fields 23(k) comprising the sub-array pointer field 21 thus points to the sub-array containing the item of data identified by process virtual address 10. Similarly, the sub-array offset field 22 includes a plurality of data item offset fields 24(k) each of which contains a value corresponding to the low-order portion $I_{kO}$ taken from the corresponding sub-array offset field 16(k) in the process virtual address 10. The collection of data item offset fields 24(k) thus points to the data item, in the sub-array pointed to by sub-array pointer field 21, identified by the process virtual address 10.

The array virtual address 12 is formed by a swapper/combiner 30 under control of a dimensionality map 31, which is, in turn, under the control of a dimensionality map pointer 35 supplied with the process virtual address 10. The swapper/combiner 30 receives the contents of all of the displacement fields 13(k) and, under control of dimensionality information $S_k$ re-orders the contents of the various displacement fields 13(k) to produce the sub-array pointer field 21 and sub-array offset field 22 in the array virtual address 12. The dimensionality map 31 uses the dimensionality map pointer 35 to select dimensionality information $S_k$ that identifies the size along the corresponding "k-th" dimension of the multi-dimensional array, and, thus, identifies the size of the corresponding displacement field 13(k) in the process virtual address 10. In addition, the dimensionality information $S_k$ identifies the size along the corresponding "k-th" dimension of each sub-array, and thus identifies the size of the corresponding sub-array offset field 16(k).

The dimensionality map pointer 35 is used to identify the particular array which contains the item of data addressed by the process virtual address 10 among a plurality of arrays which may be stored in the virtual address space defining a process. In one embodiment, as described below in connection with FIG. 4A, the dimensionality map pointer 35 corresponds to the high-order portion of the process virtual address, including the array base address pointer 14 and at least a portion of the high-order portion $I_{NH}$ of the sub-array identification field 15(N).

The swapper/combiner 30 uses the dimensionality information $S_k$ for the "k-th" dimension to identify, one, the points of separation in the array virtual address 10 between the displacement fields 13(k) to facilitate identification of all of the displacement fields 13(k), and, two, the points of separation between the sub-array identification fields 15(k) and sub-array offset fields 16(k) in each of the displacement fields 13(k) to facilitate their identification. After identifying the sub-array identification fields 15(k) and the sub-array offset fields 16(k) in the process virtual address 10, the swapper/combiner 30 can generate a re-alignment of the contents of the fields 15(k) and 16(k) to produce values for the sub-array pointer field 21 and sub-array offset field 22 of the array virtual address 12. To complete the array virtual address 12, the contents of the array base address pointer field 14 in the process virtual address 10 are copied into the corresponding field 20 of the array virtual address 12.

Figure 2:
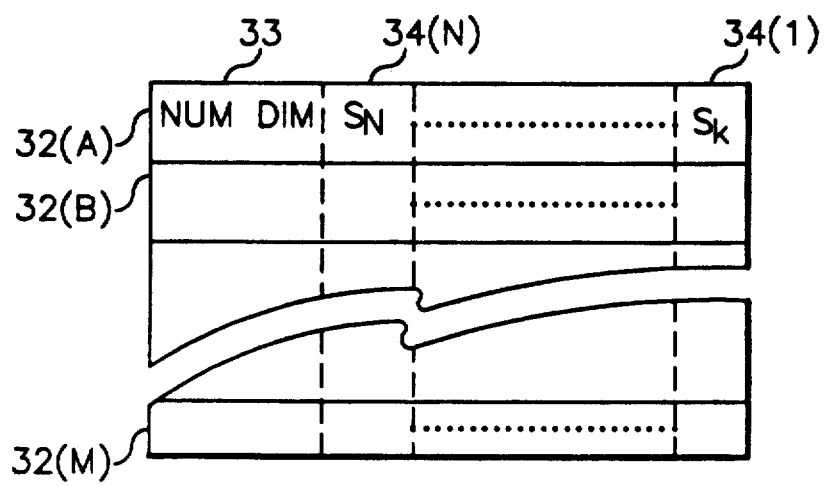
FIGS. 2 and 3 depict data structures useful in understanding the arrangement depicted in FIG. 1.

The structure of one embodiment of the dimensionality map 31 is depicted in detail in FIG. 2. With reference to FIG. 2, the dimensionality map 31 includes one or more entries 32(A) through 32(M) (generally identified by reference numeral 32) which are identified by the various values of the dimensionality map pointer 35. Each entry includes a plurality of fields, including a dimensionality number field 33 that identifies the number o dimensions in the array, and dimensionality information fields 34(1) through 34(N), with each field 34(k) containing the dimensionality information $S_k$ associated with the "k-th" dimension of the array. It will be appreciated that, since different arrays may have different numbers of dimensions, the entries 32 may have different numbers of dimensionality information fields 34(k) in the dimensionality map 31.

It will be appreciated that, in a particular embodiment, the dimensionality map 31 may be provided to accommodate a predetermined maximum number of dimensions. In that case, the dimensionality map 31 need not have a field 33 identifying the number of dimensions. Instead, the dimensionality map may have entries 32 with a fixed number of dimensionality information fields 34(k), corresponding to the predetermined maximum number of dimensions, and if a particular array has fewer dimensions, the entry 32 therefor will have non-zero values only in fields 34 corresponding to the number of dimensions in the particular array.

With reference again to FIG. 1, the particular entry 32 in the dimensionality map to be used in connection with a particular array is identified by a dimensionality map pointer 35, which is provided along with the array virtual address 10. Alternatively, the dimensionality map 31 may include, in each entry 32, a field (not shown) which contains a value corresponding to the array base address pointer for the array, and an associative search may then be performed to select the proper entry 32 in the dimensionality map 31 for use in translating the process virtual address 10.

As noted above, the dimensionality map 31 provides dimensionality information $S_k$ identifying the size along the corresponding "k-th" dimension of each sub-array. It will be appreciated that, if the sizes, along the various dimensions, of sub-arrays do not vary as among diverse data arrays that may be processed by the computer system (not shown), the swapper/combiner can determine the points of separation between the sub-array identification fields 15(k) and sub-array offset fields 16(k) in each of the displacement fields 13(k) without requiring information from the dimensionality map 31.

After the array virtual address 12 has been generated, the second step in the translation process is performed, in which the array virtual address 12 is translated into the physical address 11. In that operation, the array virtual address 12 is divided into two portions, a high-order portion used as a virtual page number VPN, and a low order portion used as a virtual page offset VPO. The virtual page number VPN identifies the virtual page in the array virtual address space of the process including the array, and the virtual page offset VPO identifies the offset into the virtual page containing the item of data identified by the process virtual address 10.

It will be appreciated that the size of the portion of the array virtual address 12 comprising the virtual page offset may be determined by the size of a page in the particular digital data processing system in which the invention is embodied, and, thus, need have no particular relation to the points of demarcation between the fields 21 and 22 or the various fields 23(k) and 24(k) of the array virtual address 12. However, in one embodiment, which will be described below in connection with FIG. 4A, the virtual page offset corresponds to the sub-array offset field 22 of the array virtual address 12.

Figure 3:
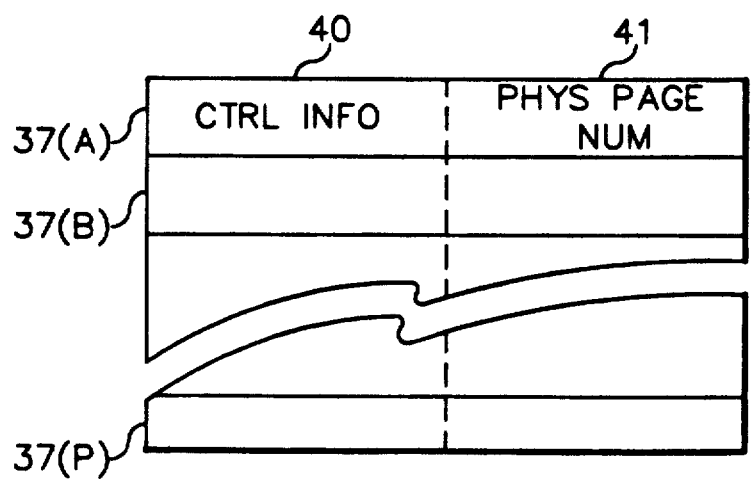

During the second translation step, the virtual page number is used as an index into a page table 36, which is used to translate all array virtual addresses for the process into physical addresses for accessing, that is, fetching information, including array data, from or storing information in, the memory. The page table 36, which is shown in detail in FIG. 3, includes a number of entries 37(A) through 37(P) (generally identified by reference numeral 37), each of which includes a control information field 40 and a physical page number field 41. The control information field 40 includes such information as whether the entry 37 can be used, how the page can be accessed, that is, whether data can be stored in the page or fetched from the page, and so forth.

The physical page number field 41 of each entry 37 in the page table 36 contains a value which identifies the block in the physical memory of the computer system (not shown) which contains the data in the virtual page. The contents of the physical page number field 41 are used as the high-order portion of the physical address 11. The virtual page offset VPO from the process virtual address is used as the low-order portion of the physical address 11, and effectively identifies the offset into th physical block of the item of data identified in the process virtual address 10. To provide the physical address 11 the virtual page offset VPO is concatenated onto the physical page number from the field 41 of the entry 37 of the page table 36 identified by the virtual page number VPN of the process virtual address. The physical address may then be used in accessing the physical memory.

While the array virtual address 12 is depicted as having the succession of sub-array identification fields 23(k) in the sub-array pointer field 21 and the succession of data item offset fields 24(k) in the sub-array offset field 22 in the same order as the displacement fields 13(k) in the process virtual address 10, it will be appreciated that the orders of the fields 23(k) and 24(k) in the respective fields 21 and 22 of the array virtual address 12 may differ from the order of the displacement fields 13(k) in the process virtual address. However, if the swapper/combiner 30 maintains the order of at least the sub-array identification field 15(N), immediately following the array base address pointer 14, in formation of the array virtual address 12, as shown in FIG. 1, and if the size of the field 15(N) is of predetermined size, or at least predetermined minimum size, it will be appreciated that the contents of the sub-array identification field 15(N), at least to the extent of the predetermined size, need not be transmitted to the swapper combiner, but instead may, with the array base address pointer, be copied directly into field 23(N).

The virtual memory management arrangement is particularly useful in connection with arrays in which processing of items of data in the array is to be performed in a localized manner in the array. The virtual memory management arrangement may be particularly useful, for example, in image processing applications, in which the array contains items of data relating to values of intensity and color of picture elements organized in the array in a similar manner as they would be displayed in the image. Typically, in such image processing applications, it is necessary to perform processing operations in connection with each item of data using adjacent or proximate items.

The arrangement enhances processing of such an array by increasing the likelihood that the items of data in a sub-array of a larger array may be stored in the same page in virtual, and, thus, in physical, memory. If a particular item of data in a sub-array is processed using adjacent or proximate items in the sub-array, all of which are in the same page, if the page containing the items of data required for processing is not in memory, only one page need be transferred into memory before the processing can occur. Further, since a page is effectively the unit of information transfer between the computer's memory and secondary storage, the information required for processing can be transferred from secondary storage to memory in one transfer operation.

It will be appreciated that, in a number of applications, such as, for example, image processing, data defining an image may not completely fill the virtual storage locations provided by an array. In that case, data defining multiple images may be included in an array, with the point of demarcation between virtual storage locations defining the images being identified by the high-order portion $l_{NH}$ of the displacement field 13(N). Similarly, data defining an image may require more virtual storage locations than may be provided in one array, in which case multiple arrays may be used, identified by different dimensionality map pointers 35.

It will further be appreciated that the virtual memory management arrangement may be embodied in hardware or software or any combination of hardware and software in a conventional manner. FIGS. 4A through 4G depict one hardware embodiment of the invention, including a first translation stage 50 and a memory management unit 51. The first translation stage 50 receives a thirty-two bit process virtual address PVA <31:00> from a processor 52 and generates, in response thereto, a physical address for addressing a memory 53. In the embodiment depicted in FIG. 4A, the arrays are limited to two dimensions, identified as "X" and "Y", and the sub-arrays are of fixed sizes, in particular, two hundred and fifty six data items per dimension in each sub-array.

Figure 4A:
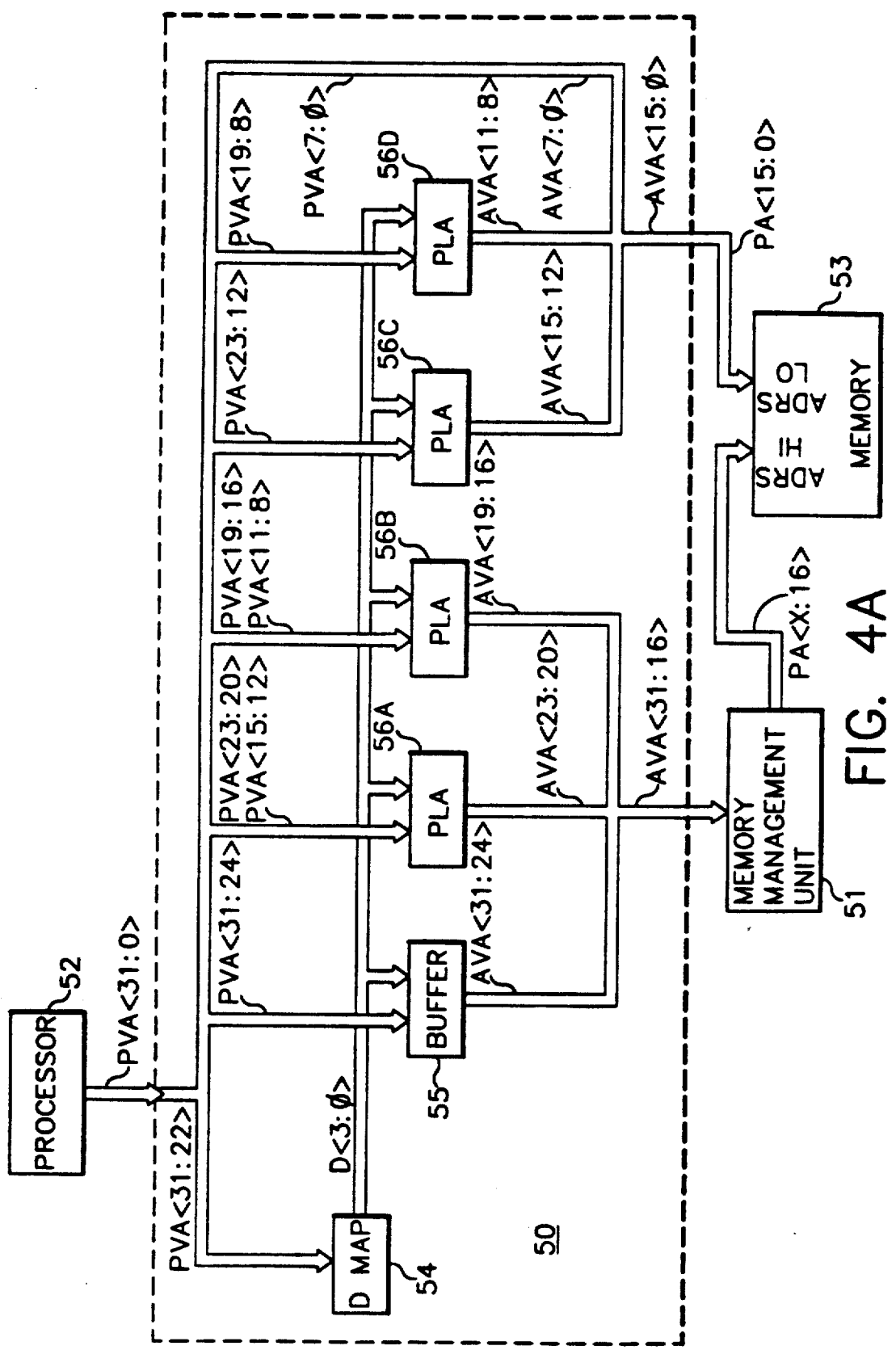

In the embodiment depicted in FIG. 4A, the process virtual address PVA <31:00> received by the first translation stage 50 includes either four or five fields, depending on the X dimension of the particular array. FIG. 4B depicts the various structures which a process virtual address PVA <31:00> may have depending on the X dimension of an array. The Y dimension of an array is constant, and is defined by eight high-order bits, identified as Y7 through Y0 in FIG. 4B, and eight low-order bits, identified as y7 through y0 in FIG. 4B. The eight high-order bits Y7 through Y0 comprise the Y-dimension sub-array pointer, and the low-order bits y7 through y0 comprise the Y-dimension sub-array offset.

On the other hand, the X dimension of an array may vary, and is defined by zero or more high-order bits, up to a maximum of eight bits, identified as X7 through X0 in in FIG. 4B, and eight low-order bits x7 through x0 in FIG. 4B. The high-order bits X7 through X0, if any, comprise the X-dimension sub-array pointer, and the low-order bits x7 through x0 comprise the X-dimension sub-array offset. If the X-dimension of the array addressed by the process virtual address PVA <31:00> is such that the process virtual address PVA <31:00> has fewer than eight high-order bits X7 through X0, the process virtual address PVA <31:00> also has high-order address bits S9 through S2 corresponding to the array base address pointer field 14. FIG. 4B depicts the structures of the process virtual address PVA <31:00> for each of the different numbers of high-order bits X7 through X0.

Accordingly, the thirty-two bit process virtual address PVA <31:00> has either four or five fields, depending on the size of the X-dimension, including, beginning with the high-order field of the process virtual address PVA <31:00>, (1) a variable-length array base address pointer field, (2) a fixed-length eight-bit high-order Y-dimension sub-array pointer field, (3) a fixed-length eight-bit low-order Y-dimension sub-array offset field, (4) a variable-length high-order X-dimension sub-array pointer field, and (5) a fixed-length eight-bit low-order X-dimension sub-array offset field.

With this background, first translation stage 50 receives the process virtual address PVA <31:00> and generates in response thereto a thirty-two bit array virtual address AVA <31:00>, comprising a high-order portion AVA <31:16> that includes both the array base address pointer field 20 and the sub-array pointer field 21 in the array virtual address 12 (FIG. 1) and a low-order portion AVA <15:00) which corresponds to the sub-array offset field 22 in the array virtual address 12 (FIG. 1). The result of the first translation stage, which corresponds to the array virtual address 12 (FIG. 1), is a thirty-two bit array virtual address AVA <31:00> shown in FIG. 4C. The array virtual address AVA <31:00>, like the process virtual address PVA <31:00>, has either four or five fields, depending on the size of the X-dimension in the process virtual address PVA <31:00>, including, beginning with the high-order field of the array virtual address AVA <31:00>, (1) a variable-length array base address pointer field, (2) a fixed-length eight-bit high-order Y-dimension sub-array pointer field, (3) a variable-length high-order X-dimension sub-array pointer field, (4) a fixed-length eight-bit low-order Y-dimension sub-array offset field as array virtual address AVA <15:08>, and (5) a fixed-length eight-bit low-order X-dimension sub-array offset field as array virtual address AVA <07:00>.

Fields (1), (2) and (3) of the array virtual address, which comprise array virtual address bits AVA <31:15>, form a virtual page number VPN (see FIG. 1), and are used by the memory management unit 51 to perform a second translation operation to form the physical page number of physical address 11, that is, the high-order bits of a physical address PA <x:16>, where "x" depends on the size of the physical memory 53. The low order bits of the physical address PA <15:00>, corresponding to the physical page offset of physical address 11, comprise the eight-bit low-order Y-dimension sub-array offset field, comprising array virtual address AVA <15:08>, as physical address PA <15:08>, and the eight-bit low-order X-dimension sub-array offset field, comprising array virtual address AVA <07:00>, as physical address PA <07:00>. In one embodiment, the memory management unit 51 performs a page table look-up operation as described above to generate the physical page number.

As noted above, the first translation stage 50 receives the process virtual address PVA <31:00> from processor 52 and generates in response thereto the thirty-two bit array virtual address AVA <31:00>. The first translation stage 50 includes a dimensionality map 54 which receives the ten high-order bits of the process virtual address PVA <31:22> and generates in response thereto a four-bit dimensionality value D <3:0> identifying the length of the variable-length high-order X-dimension sub-array pointer field. The dimensionality map 54 includes a maximum of 1024 entries, each corresponding to one encoding of the ten high-order PVA <31:22> process virtual address bits, and the contents of each entry includes a four bit dimensionality value D <3:0>.

In the translation stage 50, the eight high-order bits of the process virtual address PVA <31:00>, which, as can be seen by comparing FIG. 4B and FIG. 4C, are not changed by the first translation stage 50, are buffered in a buffer 55. Similarly, the eight low-order bits of the process virtual address PVA <7:0>, which also are not changed by the first translation stage 50, are transmitted directly to the memory 53. The sixteen intermediate process virtual address bits PVA <23:08> that are changed by the first translation stage 50 are transmitted to four programmable logic arrays 56A through 56D, each of which receives several bits of the process virtual address PVA and generates portions of the array virtual address AVA. The programmable logic array 56A through 56D correspond to the swapper/combiner 30 depicted in FIG. 1.

In particular, the programmable logic array 56A receives process virtual address PVA <23:20> and PVA <15:12> and generates array virtual address AVA <23:20> and programmable logic array 56B receives process virtual address PVA <19:16> and PVA <11:08> and generates in response thereto array virtual address AVA <19:16>. Similarly, programmable logic array 56C receives process virtual address PVA <23:12> and generates in response thereto array virtual address AVA <15:12> and programmable logic array 56D receives process virtual address PVA <19:08> and generates in response thereto array virtual address AVA <11:08>. FIGS. 4D through 4G depict the programming of each of the programmable logic arrays 56A through 56D, respectively, to achieve the required swapping and combining of the various portions of the process virtual address as depicted in FIG. 4B, to form the array virtual address as depicted in FIG. 4C, in response to the dimensionality D <3:0> information from the dimensionality map 54.

It can be seen that, when the dimensionality D <3:0> information corresponds to zero, then programmable logic arrays 56A through 56D produce an array virtual address AVA <31:00> that is the same as the process virtual address PVA <31:0-0>, and so the embodiment depicted in FIG. 4A can be used in connection with translation of virtual addresses for data which is not organized in arrays as well as data that is organized into arrays. For those portions of a process virtual address space in which data is not organized into arrays, the process virtual address PVA <31:00> is conditioned to enable the dimensionality map 54 to generate dimensionality D <3:0> information corresponding to zero, and the first translation stage 50 effectively passes the process virtual address to the memory management unit 51, which may then perform a conventional translation operation using the process's page tables as described above in connection with FIG. 1.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A virtual memory management apparatus for translating a process virtual address of an item of data in a multidimensional array having at least two dimensions into a physical address for use in accessing a memory, the apparatus comprising:

A. a virtual address translation stage for rearranging selected fields of a process virtual address to form an array virtual address including a sub-array identifier identifying a multidimensional sub-array in said multidimensional array and an array virtual offset identifying a virtual storage location in the sub-array corresponding to said item of data; and B. a physical address translation stage connected to said virtual address translation means for translating selected fields of the array virtual address to form a physical address for use in accessing a memory which contains said item of data.

2. A virtual memory management arrangement as defined in claim 1 in which said process virtual address further includes a process base address portion containing a process base address pointer and said array virtual address further includes an array base address pointer portion, the virtual address translation portion generating an array base address pointer for storage in said array base address pointer portion in response to the process base address pointer.

3. A virtual memory management apparatus for translating a process virtual address of an item of data in a multidimensional array having at least two dimensions into a physical address for use in accessing a memory, the apparatus comprising:

A. a virtual address translation stage for rearranging selected fields of a process virtual address to form an array virtual address including a sub-array identifier identifying a sub-array in said multidimensional array and an array virtual offset identifying a virtual storage location in the sub-array;

the process virtual address comprising a plurality of dimensional pointers each of which identifies a virtual storage location in connection with a dimension of the multidimensional array, each of said dimensional pointers including a sub-array along the dimension and a sub-array offset portion pointing to the offset, within the sub-array, of the virtual storage location, said virtual address translation stage including an array virtual address formation stage that forms the array virtual address including a sub-array pointer and a sub-array offset, the sub-array pointer being formed in response to the sub-array displacement portions of all of said dimensional pointers, and the sub-array offset being formed in response to the sub-array offset portions of all of said dimensional pointers; and B. a physical address translation stage connected to said virtual address translation means for translating selected fields to the array virtual address to form a physical address for use in accessing a memory which contains said item of data.

4. A virtual memory management arrangement as defined in claim 3 in which the virtual address translation stage further includes a dimensionality map for generating dimensionality indicia defining the demarcations, within a process virtual address, between the respective dimensional pointers, the array virtual address formation stage using the dimensionality indicia to identify the dimensional pointers within the process virtual address.

5. A virtual memory management arrangement as defined in claim 4 wherein said dimensionality map includes a plurality of entries each including dimensionality information for an array, the arrangement further including a pointer store which receives a pointer to identify one of said entries, the dimensionality map using the dimensionality information in the entry identified by the pointer in generating the dimensionality indicia.

6. A virtual memory management arrangement as defined in claim 4 wherein said process virtual address further includes a process base address pointer, the dimensionality map including a plurality of entries each including dimensionality information for an array, the dimensionality map using the process base address pointer to select one of said entries and using the dimensionality information in the selected entry in generating the dimensionality indicia.

7. A virtual memory management arrangement as defined in claim 6 wherein said array virtual address further includes an array base address pointer portion, the virtual address translation portion generating an array base address pointer for storage in said array base address pointer portion in response to the process base address pointer.

8. A virtual memory management arrangement as defined in claim 3 in which the array virtual address formation stage includes a swap portion that aggregates the sub-array pointer portions of all of the dimensional pointers to form the sub-array pointer and the sub-array offset portions of all of the dimensional pointers to form the sub-array offset.

9. A virtual memory management apparatus for translating a process virtual address of an item of data in a multidimensional array having at least two dimensions into a physical address for use in accessing a memory, the apparatus comprising:
   A. a virtual address translation stage for rearranging selected fields of a process virtual address to form an array virtual address including a sub-array identifier identifying a sub-array in said multidimensional array and an array virtual offset identifying a virtual storage location in the sub-array corresponding to said item of data; and
   B. physical address translation means connected to said virtual address translation means for translating selected fields of the array virtual address to form a physical address for use in accessing a memory which contains said item of data, said physical address translation stage comprising a page number generation stage that receives a high-order portion of said array virtual address as a virtual page number and generates a response thereto a physical page number, and a page offset stage that receives a low-order portion of said array virtual address and generates in response thereto a physical offset position, the physical address comprising the physical page number and physical offset portion.

10. A virtual memory management arrangement as defined in claim 9 in which said physical address translation stage includes a page table comprising a plurality of page table entries each identifying a correspondence between a virtual page number value and a physical page number value, the page number generation portion using the virtual page number to identify a page table entry and obtain the physical page number value from the identified page table entry, the physical address translation stage using the physical page number value to generate a physical page number for use in the physical address.

11. A virtual memory management process for translating a process virtual address of an item of data in a multidimensional array having at least two dimensions into a physical address for use in accessing a memory, comprising the steps of:
   A. rearranging selected fields of a process virtual address to form an array virtual address including a sub-array identifier identifying a sub-array in said multidimensional array and an array virtual offset identifying a virtual storage location in the sub-array; and
   B. translating selected fields of the array virtual address to form a physical address for use in accessing a memory which contains said item of data.

12. A virtual memory management process as defined in claim 11 in which said process virtual address further includes a process base address portion containing a process base address pointer and said array virtual address further includes an array base address pointer portion, the virtual address translation step including the step of generating an array base address pointer for storage in said array base address pointer portion in response to the process base address pointer.

13. A virtual memory management process for translating a process virtual address of an item of data in a multidimensional array having at least two dimensions into a physical address for use in accessing a memory, comprising the steps of:
   A. rearranging selected fields of a process virtual address to form an array virtual address including a sub-array identifier identifying a sub-array in said multidimensional array and an array virtual offset identifying a virtual storage location in the sub-array;

the process virtual address comprising a plurality of dimensional pointers each of which identifies a virtual storage location in connection with a dimension of the multidimensional array, each of said dimensional pointers including a sub-array displacement portion pointing to the sub-array along the dimension and a sub-array offset portion pointing to the offset, within the sub-array, of the virtual storage location;

said virtual address translation step including an array virtual address formation step that forms the array virtual address including a sub-array pointer and a sub-array offset, the sub-array pointer being formed in response to the sub-array displacement portions of all of said dimensional pointers, and the sub-array offset being formed in response to the sub-array offset portions of all of said dimensional pointers; and B. translating selected fields of the array virtual address to form a physical address for use in accessing a memory which contains said item of data.

14. A virtual memory management process as defined in claim 13 in which the virtual address translation step further includes using a dimensionality map to generate dimensionality indicia defining the demarcations, within a process virtual address, between the respective dimensional pointers, the dimensionality indicia being used in the array virtual address formation step to identify the dimensional pointers within the process virtual address.

15. A virtual memory management process as defined in claim 14, said dimensionality map includes a plurality of entries each including dimensionality information for an array, the process further using a pointer store which receives a pointer to identify one of said entries, the dimensionality information in the entry identified by the pointer being used in generating the dimensionality indicia.

16. A virtual memory management process as defined in claim 14 wherein said process virtual address further includes a process base address pointer, the dimensionality map including a plurality of entries each including dimensionality information for an array, the process base address pointer being used to select one of said entries and the dimensionality information in the selected entry being used in generating the dimensionality indicia.

17. A virtual memory management process as defined in claim 16 wherein said array virtual address further includes an array base address pointer portion, the virtual address translation step including the step of generating an array base address pointer for storage in said array base address pointer portion in response to the process base address pointer.

18. A virtual memory management process as defined in claim 13 in which the array virtual address formation step includes the step of aggregating the sub-array pointer portions of all of the dimensional pointers to form the sub-array pointer and the sub-array offset portions of all of the dimensional pointers to form the sub-array offset.

19. A virtual memory management process for translating a process virtual address of an item of data in a multi-dimensional array having at least two dimensions into a physical address for use in accessing a memory, comprising the steps of:
   A. rearranging selected fields of a process virtual address to form an array virtual address including a sub-array identifier identifying a sub-array in said multi-dimensional array and an array virtual offset identifying a virtual storage location in the sub-array; and
   B. translating selected fields of the array virtual address to form a physical address for use in accessing a memory which contains said item of data by
      receiving a high-order portion of said array virtual address as a virtual page number and generating a physical page number in response thereto, and
      receiving a low-order portion of said array virtual address and generating a physical offset portion in response thereto, the physical address comprising a physical page number and physical offset portion.

20. A virtual memory management process as defined in claim 19 in which said physical address translation step includes the step using the virtual page number to obtain, from a page table entry in a page table comprising a plurality of page table entries each identifying a correspondence between a virtual page number value and a physical page number value, the physical page number value from a page table entry, the physical page number value being used to generate a physical page number for use in the physical address.

21. A virtual memory management apparatus for translating a process virtual address having a sequence of dimensional pointers, each dimensional pointer having a higher order portion and a lower order portion, which identify a selected item of data in a multidimensional array having at least two dimensions, into a physical address which identifies a storage location in physical memory, the apparatus comprising:
   a first address translation means for deriving from the higher order portion of each said dimensional pointer, a first pointer which identifies a sub-array of data items which includes said selected item, and
   a second address translation means for deriving from the lower order portion of each said dimensional pointer, a second pointer which identifies said selected item of data in said sub-array of data items.

22. The virtual memory management apparatus of claim 21 wherein said address translation means comprises a swapping means for concatenating said higher order portions of each dimensional pointer to form said first pointer and for concatenating said lower portions of said dimensional pointer to form said second pointer.

23. The virtual memory management apparatus of claim 21 further comprising a dimensionality map for generating dimensionality indicia defining demarcations, within a process address, between the respective dimensional pointers, the address translation means using the dimensionality indicia to identify the dimensional pointers within the process address.

24. The virtual memory management apparatus of claim 23 wherein said dimensionality map includes a plurality of entries each including dimensionality information for an array, and wherein the virtual memory management apparatus further comprises a pointer store which receives a pointer to identify one of said entries, the dimensionality map using the dimensionality information in the entry identified by the pointer in generating the dimensionality indicia.

25. The virtual memory management apparatus of claim 23 wherein said process address further includes a process base address pointer, wherein
   the dimensionality map includes a plurality of entries each including dimensionality information for an array, the dimensionality map using the process address pointer to select one of said entries and using the dimensionality information in the selected entry in generating the dimensionality indicia.

* * * * *